June 29, 1954  L. J. WOLF  2,682,419
ADJUSTABLE TANDEM AXLE TRAILER
Filed June 11, 1952  2 Sheets-Sheet 1
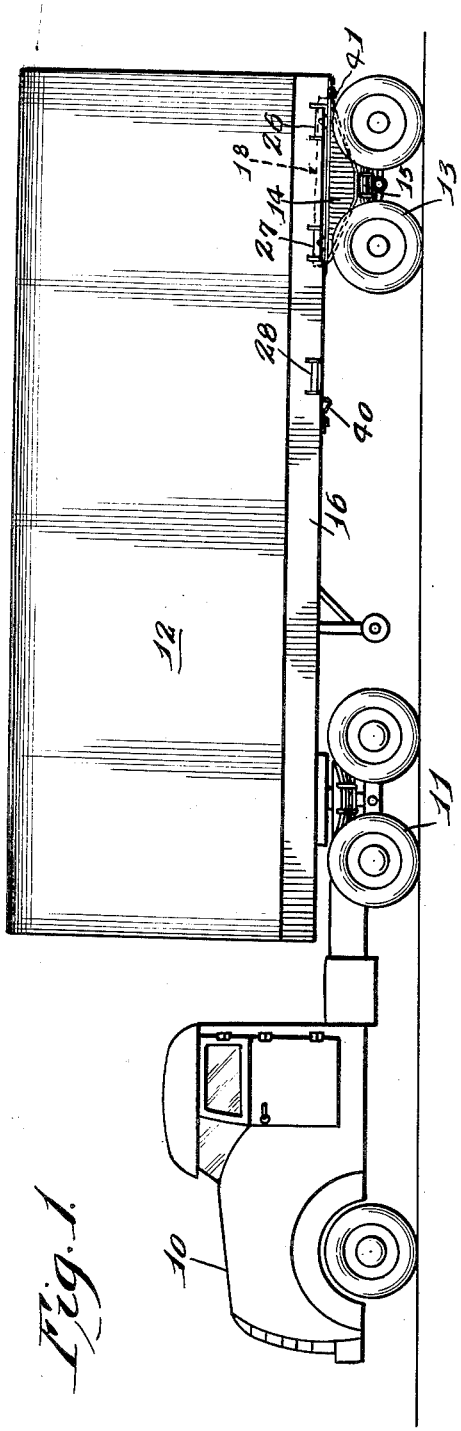
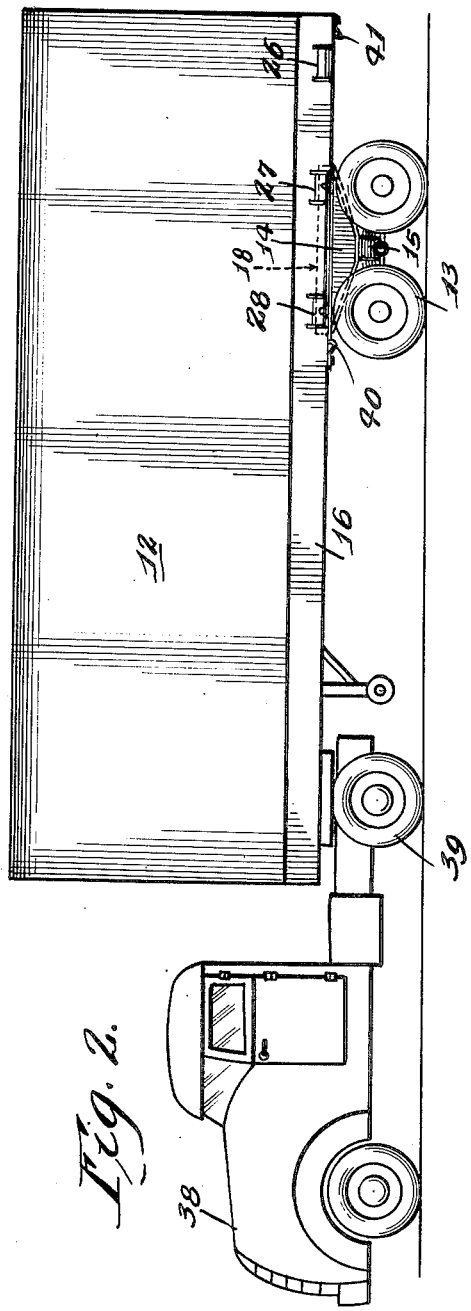
Inventor.
Lloyd J. Wolf.
By John W Darley
Attorney

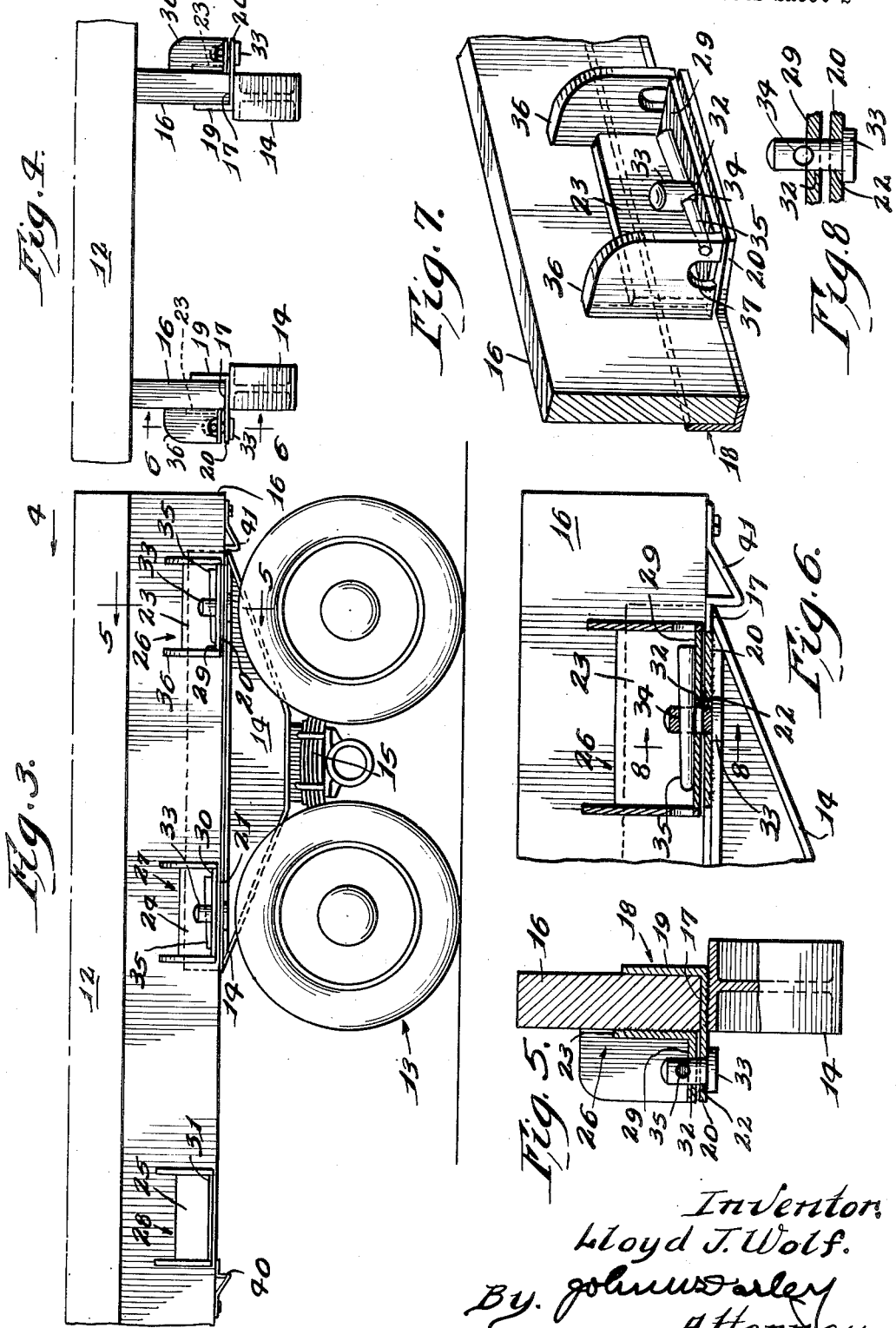

Patented June 29, 1954

2,682,419

UNITED STATES PATENT OFFICE 2,682,419

ADJUSTABLE TANDEM AXLE TRAILER

Lloyd J. Wolf, Irving, Tex.

Application June 11, 1952, Serial No. 292,904

5 Claims. (Cl. 280—405)

1

My invention relates to tractor drawn, tandem axle trailers of the type wherein the forward end of the trailer is supported on the aft end of the tractor and more particularly to an arrangement for insuring maximum loading of the trailer regardless of the kind of tractor to which the trailer is hitched.

Statutory limitations on the wheel loads of highway vehicles have necessitated the development of commercial types that meet the requirements. In the case of tractor drawn trailers, the maximum pay load can be carried on a trailer having tandem axles located as near as possible to the rear end of the trailer while the forward end of the latter is supported on a tractor having tandem axles at its rear end. With this type of equipment, the trailer frame may be regarded as a beam which is supported at its ends and if it is assumed that the trailer is uniformly loaded, this load will be divided equally between the four trailer wheels and the aft four wheels of the tractor.

An approximation of this loading can be accomplished with a tractor having a single rear axle, but only if the tandem axles of the trailer are set well forward of the rearmost position noted above. In this case, a part of the load on the trailer is supported aft of the latter's wheels and the load on the trailer wheels is much greater than that on the rear wheels of the tractor.

Truck fleets generally include single and tandem axle tractors and for the best pay loading, the practice is to hitch to a tandem axle tractor a trailer having tandem axles set well to the rear, and to pull a trailer having tandem axles set further forward by a tractor having a single rear axle.

This optimum mode of operation not only requires two types of trailers, but also that the correct trailer shall be matched with the appropriate tractor which is not always possible. The exigencies of service necessitate frequent coupling and uncoupling of the respective units for loading, unloading and repair so that an operator at some point in the freighting system may find available only a single axle tractor for coupling to a trailer having its tandem axles set well aft. The operator must then sacrifice pay load for it will be apparent that if the trailer is loaded to the capacity which its tandem axles would otherwise permit, the load on the single axle of the tractor will be well above the legal limit. Accordingly, the load on the trailer must be reduced substantially below its maximum capacity which

2 is objectionable from the standpoint of efficient operation.

It is therefore the principal object of my invention to devise a tandem axle trailer that is constructed and arranged to provide maximum load capacity whether coupled to a single or tandem axle tractor.

A further object is to provide a trailer of the character indicated wherein its tandem axle assembly may be shifted from a position well aft of the trailer to a position forward thereof corresponding to maximum load capacity positions when coupled to a tandem axle and a single axle tractor, respectively.

A further object is to devise an adjustable tandem axle assembly for trailers wherein simple and easily handled means are provided to connect the assembly and to insure proper alignment thereof with respect to the trailer frame.

These and further objects of the invention will be set forth in the following specification, reference being had to the accompanying drawings and the novel means by which said objects are effectuated will be definitely pointed out in the claims.

In the drawings:

Figs. 1 and 2 are side elevations of my improved trailer coupled to a tandem axle and a single axle tractor, respectively.

Fig. 3 is an enlarged, side elevation of the rear end of the trailer when conditioned as shown in Fig. 1.

Fig. 4 is a fragmentary, rear end view of the trailer looking in the direction of the arrow 4 in Fig. 3, the wheels and suspension being omitted.

Figs. 5 and 6 are enlarged sections along the lines 5—5 and 6—6 in Figs. 3 and 4, respectively.

Fig. 7 is an enlarged, perspective view of the connection assembly between the trailer frame and the trailer axle assembly.

Fig. 8 is an enlarged section along the line 8—8 in Fig. 6 showing the relation of the associated parts before the insertion of the locking pin.

Referring to Fig. 1 of the drawings, the numeral 10 designates a conventional tractor having at the rear end thereof a tandem axle assembly generally indicated by the numeral 11. The forward end of a trailer 12 is coupled to the tractor 10 in the usual manner above the axle assembly 11 and the rear end of the trailer is supported on a tandem axle assembly 13 which also may be of conventional construction except to the extent presently noted. Briefly, the invention consists in slidably relating the assembly 13 to the trailer frame so that it may occupy the rearmost position shown in Fig. 1 when coupled to a tandem axle tractor and a position forward thereof as shown in Fig. 2 when coupled to a single axle tractor.

The specific means for accomplishing the foregoing are more particularly illustrated in Figs. 3 to 7, inclusive, to which reference will now be made.

In the particular arrangement shown, the trailer axle assembly 13 includes a pair of beams 14, one on each side of the trailer frame, which transmit the trailer load through springs 15 to the trailer axles, each beam 14 being located beneath a side frame member 16 of the trailer frame. The horizontal wing 17 of a metallic angle 18 is interposed between the under surface of the frame member 16 and the top surface of the beam 14, extends for the full length of the beam and is welded thereto, but is not connected directly to the frame member 16. From the foregoing and so far as described, it will be apparent that the trailer load is transmitted through the wings 17 to the beams 14 and that when the trailer axle assembly 13 is shifted relative to the trailer frame as presently described, the wings 17 provide smooth surfaces along which the frame members 16 may slide. The vertical wings 19 of the angles 18 abut the inner sides of the frame members 16, respectively, and serve as guides for maintaining the axle assembly 13 in proper alignment relative to the trailer frame in any shifted position of the assembly.

Adjacent the rear and forward ends of each wing 17, horizontal pads 20 and 21, respectively, of identical shape extend laterally outward from the beams 14 and each pad is centrally apertured at 22, the pads being spaced from each other lengthwise of the frame. Along the outer surface of each frame member 16, the vertical wings 23, 24 and 25 of identical angles 26, 27 and 28, respectively, are welded thereto and spaced therealong, the spacing between any two adjacent angles along the same frame member 16 being equal to the lengthwise spacing of the pads 20 and 21. The horizontal wings 29, 30 and 31 of the angles 26, 27 and 28, respectively, extend laterally outward from the associated frame member 16 and each is centrally apertured at 32.

In the rearmost position of the trailer axle assembly as shown in Fig. 3, connection between the trailer frame members 16 and the assembly 13 is accomplished by tying the pads 20 and 21 to the horizontal wings 29 and 30, respectively. In this position of the axle assembly 13, the aperture 22 in the pads 20 and 21 register with the aperture 32 in the horizontal wings 29 and 30 of the angles 26 and 27, all respectively, and the wings 29 and 30 are preferably slightly spaced in a vertical direction above the pads 20 and 21, respectively. This spacing may be of the order of about one-eighth of an inch.

A headed pin 33 is inserted upwardly through each pair of registering apertures 22 and 32 so that its upper end extends a convenient distance above the wings 29 and 30. Each pin 33 is transversely apertured at 34 to receive a tapered locking pin 35 which lies parallel to and along the upper surface of the wing 29 or 30. To achieve a positive lock, the location of the aperture 34 in the shank of the pin 33 is such that when the latter is inserted through the apertures 22 and 32 to place the head of the pin 33 in contact with the underside of the pad 20 or the pad 21 (see Fig. 8), the bottom of the aperture 34 lies slightly below the upper surface of the wing 29 or the wing 30 as the case may be. Therefore, when the tapered locking pin 35 is driven home through the aperture 34, the associated pad 20 and wing 29, for example, move relatively towards each other and sufficient friction contact is set up between the locking pin 35 and wing 29 to maintain the former in position.

To prevent inadvertent release of the locking pins 35 as by striking an object outside of the trailer, shield wings 36 are placed at the ends of the angles 26, 27 and 28, these wings extending laterally from the frame members 16 and being welded thereto and to the ends of the angles and each wing 36 includes an aperture 37 to permit entrance of the locking pins 35 and access to the latter for removal.

When the trailer is arranged as shown in Figs. 1 and 3, i. e., with the axle assembly 13 in the rearmost position and connected to the angles 26 and 27 and the forward end of the trailer coupled to the tractor 10 having the tandem axle assembly 11, it is conditioned for maximum pay load because the ends of the trailer are supported on axle assemblies having equal load capacities. However, if service conditions necessitate the coupling of the trailer to a tractor 38 (see Fig. 2) having a single rear axle assembly 39, it will be apparent that, if the trailer axle assembly 13 is maintained in the rearmost position shown in Fig. 1, a loading of the trailer to full capacity will overload the tractor axle assembly 39 due to the lower capacity of the latter. Under these conditions, the load on the trailer must be lightened to less than a full pay load which is uneconomical, the maximum load being determined by the permissible load that can be applied to the single axle of the tractor 38.

The foregoing problem is solved in the following manner. After coupling the trailer 12 as it appears in Fig. 1 to the tractor 38, the brakes are set on the trailer axle assembly 13 and the pins 33 and 35 are removed to thereby break all positive connection between the assembly 13 and the trailer frame. The tractor 38 is then backed to cause the trailer frame members 16 to slide along the wings 17 until either the forward ends of the angles 18 or the beams 14 as the case may be engage stops 40 secured to the undersides of the frame members 16. During this movement, the wings 19 guide the axle assembly 13 and insure its alignment with respect to the trailer frame in the shifted position.

The axle assembly 13 then occupies the further forward position shown in Fig. 2, with the apertures 22 in the pads 20 and 21 registering with the apertures 32 in the angles 27 and 28, respectively. The assembly 13 is then locked in position by the pins 33 and locking pins 35 in the manner described above.

With the axle assembly 13 in the forward position, there is a substantial overhang of the trailer frame aft of the assembly and the load on this part of the trailer body is carried entirely on the axle assembly 13. The load on the trailer between the axle assemblies 13 and 39 will be determined by the legal capacity of the latter, but the total of these loads, i. e., those fore and aft of the trailer axle assembly 13 will approximate that carried by the trailer when arranged as shown in Fig. 1. In any case, when coupled to a single axle tractor, the permissible load capacity of the trailer when conditioned as in Fig. 2 will be substantially larger than that possible with the trailer as arranged in Fig. 1.

If now it is desired to couple the trailer shown in Fig. 2 to the tandem axle tractor 10, this connection is made first, the brakes are set on the trailer axle assembly 13, the pins 35 and 33 are withdrawn, and the tractor 10 is moved forward until the rear ends of the angles 18 or the beams 14 as the case may be engage stops 41 also secured to the undersides of the frame members 16. This movement places the axle assembly 13 in the rearmost position shown in Fig. 1 and the pins 33 and 35 are mounted in the manner described above.

An important feature of the invention is the simplicity of the adjustable connection and the flexibility of its use. The spacing of the pads 20 and 21, and of the angles 26, 27 and 28 may be varied as desired in their application to multi-styled trailers to provide a variety of load characteristics as determined by their coupling to single or tandem axle tractors.

Further, and due to the capacity of the trailer axle assembly 13 to be readily removed from beneath the box type trailer as shown, it is possible to employ this assembly beneath entirely different styles of trailers, such as pole trailers and lowboys, each of which would include angles similar to the angles 26, 27 and 28 and for a like purpose. This capability is particularly useful to an operator whose pieces of equipment differ widely in their uses. The design also possesses important advantages for the small operator who may have only one tractor. Since the cost of the tandem axle assembly 13 is well over one-half of the total cost of the trailer, the small operator may mount any one of a variety of trailer bodies on the assembly 13.

It will be understood that the trailer axle assembly 13, as illustrated, is largely diagrammatic and not restrictive. However this assembly is arranged, it will include on the upper and opposite sides thereof members having sliding and guiding functions similar to the angles 18 and on which the trailer frame rests.

I claim:

1. A trailer arranged at its forward end for coupling support on the rear end of a tractor and including side frame members, a tandem axle assembly for supporting the rear end of the trailer, a pair of oppositely related angle pieces secured to the axle assembly, the horizontal wings and the vertical wings, respectively, of the angle pieces being slidably, supportably and guidably related to the side frame members, and means for detachably connecting the assembly to the trailer in any one of a plurality of positions lengthwise of the trailer including a pair of horizontal, spaced and apertured pads extending laterally from the horizontal wings, a plurality of other angle pieces spaced from each other lengthwise of the trailer and having their vertical wings secured to the outer sides of each side frame member, the spacing of said other angle pieces being equal to the spacing of the pads and the number of said other angle pieces being greater than the number of the pads, the horizontal wings of said other angle pieces being apertured and two of the last named horizontal wings and their apertures overlying in spaced relation thereto and registering with the pads and their apertures, respectively, in any selected position of the axle assembly, a headed pin extending upwardly through each pair of registering apertures and having an aperture through the shank thereof whose lower portion normally lies below the upper surface of the associated, last named horizontal wing, and a tapered locking pin insertable through each shank aperture to thereby relatively draw the associated pad and last named horizontal wing towards each other.

2. In vehicle construction, the combination of a pair of side frame members, a wheeled axle assembly, and means for detachably connecting the assembly to the frame members including pairs of cooperating fin-like members extending laterally from and respectively secured to each frame member and the axle assembly, the fin-like members in each pair being vertically spaced from and lying in superposed relation to each other and having registering apertures, a headed pin extending upwardly through each pair of registering apertures and having an aperture through the shank thereof whose lower portion normally lies below the upper surface of the fin-like member which is secured to the side frame member, and a tapered locking pin insertable through each shank aperture to thereby relatively draw the associated fin-like members towards each other.

3. A trailer arranged at its forward end for coupling support on the rear end of a tractor and including side frame members, a tandem axle assembly for supporting the rear end of the trailer, and means for detachably connecting the assembly to the trailer in any one of a plurality of positions lengthwise of the trailer including a first group of apertured fins extending laterally from and spaced along each frame member, a second group of apertured fins extending laterally from and spaced along the outer sides of the axle assembly, the spacing of the fins in both groups being equal and the number of fins in the first group being greater than the number of fins in the second group, the fins in the second group underlying an equal number of fins in the first group in spaced relation thereto and with the apertures in each pair of facing fins in registration, a headed pin extending through each pair of registering apertures and having an aperture through the shank thereof normally partially masked by one of the associated fins, the head of the pin engaging the other fin, and a tapered locking pin insertable through each shank aperture to thereby draw the associated fins towards each other.

4. A trailer arranged at its forward end for coupling support on the rear end of a tractor and including side frame members, a tandem axle assembly for supporting the rear end of the trailer, a pair of oppositely related pieces secured to the axle assembly and slidably, supportably and guidably related to the side frame members, and means for detachably connecting the assembly to the trailer in any one of a plurality of positions lengthwise of the trailer including a first group of apertured fins extending laterally from and spaced along each frame member, a second group of apertured fins extending laterally from and spaced along each piece, the spacing of the fins in both groups being equal and the number of fins in the first group being greater than the number of fins in the second group, the fins in the second group underlying an equal number of fins in the first group in spaced relation thereto and with the apertures in each pair of facing fins in registration, a headed pin extending through each pair of registering apertures and having an aperture through the shank thereof normally partially masked by one of the associated fins, the head of the pin engaging the other fin, and a tapered locking pin insertable through each shank aperture to thereby draw the associated fins towards each other.

5. In vehicle construction, the combination of a pair of side frame members, a wheeled axle assembly, and means for detachably connecting the assembly to the frame members including pairs of fins extending laterally from and respectively secured to each frame member and the axle assembly, the fins in each pair being vertically spaced from and lying in superposed relation to each other and having registering apertures, a headed pin extending through each pair of registering apertures and having an aperture through the shank thereof normally partially masked by one of the associated fins, the head of the pin engaging the other fin, and a tapered locking pin insertable through each shank aperture to thereby draw the associated fins towards each other.

References Cited in the file of this patent

UNITED STATES PATENTS

| Number | Name | Date |
|---|---|---|
| 2,589,678 | De Lay | Mar. 18, 1952 |